Patented Nov. 21, 1922.

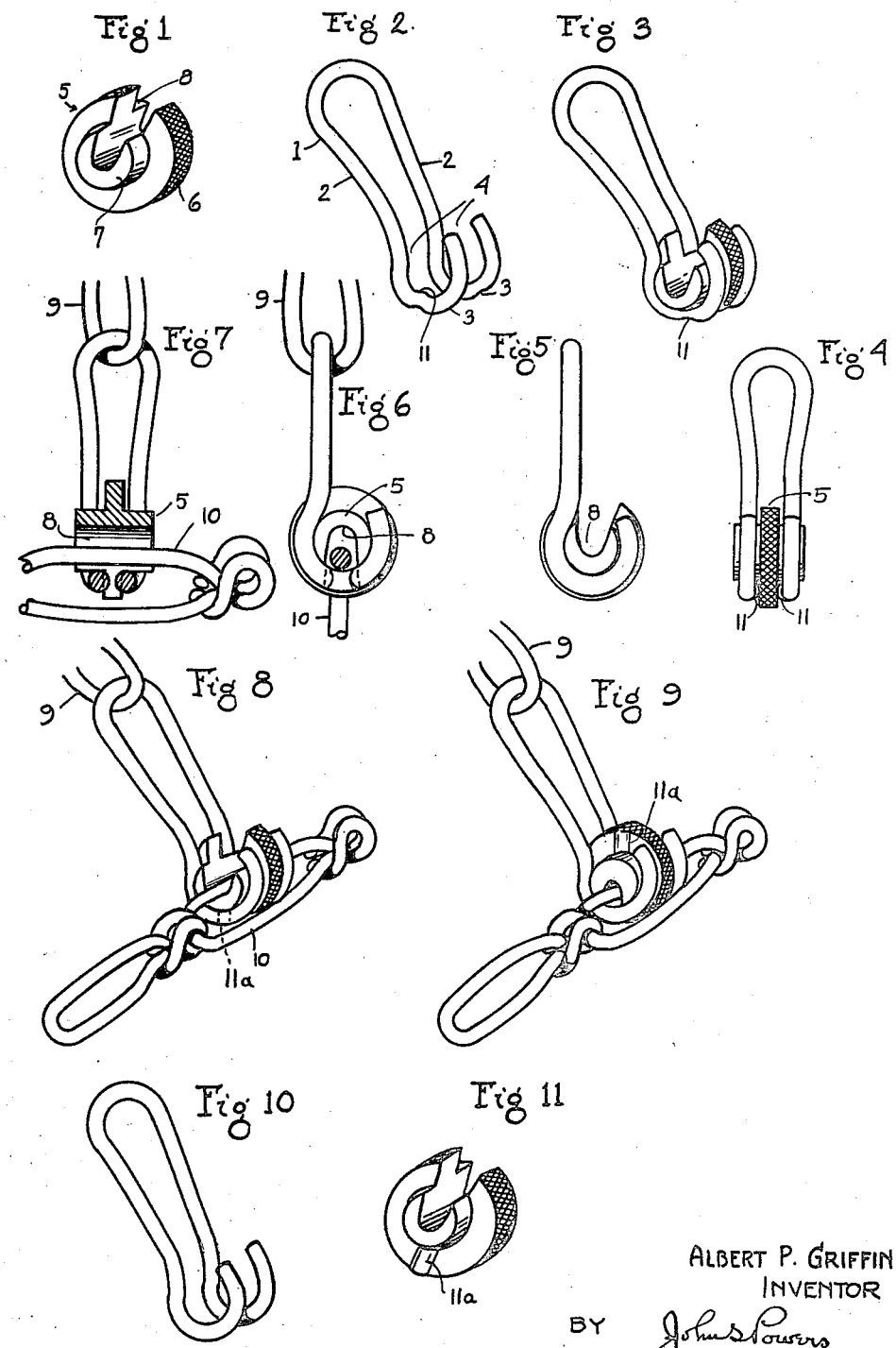

1,436,343

UNITED STATES PATENT OFFICE.

ALBERT P. GRIFFIN, OF TROY, NEW YORK, ASSIGNOR TO ARROW GRIP MANUFACTURING COMPANY, INC., OF GLENS FALLS, NEW YORK, A CORPORATION OF NEW YORK.

CHAIN CONNECTOR.

Application filed April 5, 1922. Serial No. 549,778.

*To all whom it may concern:*

Be it known that I, ALBERT P. GRIFFIN, a citizen of the United States, residing at Troy, in the county of Rensselaer and State of New York, have invented certain new and useful Improvements in Chain Connectors, of which the following is a specification.

This invention relates to chain connectors and more particularly to improvements in a chain connector having the structural features disclosed in my prior Patent No. 1,394,618 of October 25, 1921.

Such a device is especially intended and applicable for the connection of the cross chain elements and longitudinal chain elements of skid chains for use with pneumatic or other vehicle tires.

The principal object of the present invention is to provide simple and effective means for holding the parts of the connector in operative relation, thereby to maintain the skid chain elements in operative assembly, when the skid chain is not in use and its chain elements are not under tension and are indiscriminately folded, rolled or otherwise placed.

The chain connector of my prior patent consists of a coupling link having adjacent terminal hooks and a keeper journalled in said hooks and provided with a recess by means of which the terminal link of a cross chain may be threaded upon the coupling link and a link of a longitudinal chain may be threaded into the hooks. The coupling link and the keeper form companion elements and the keeper has a normal operative position in which it closes the coupling link and effectively secures the adjacent links of the cross and longitudinal chains.

With the above stated object in view the present invention consists in the provision of a part or parts on one of said companion elements for co-operation with the other element for automatically and effectively securing the keeper in its closed or operative position, preferably without presenting any obstruction to the ordered movement of the keeper to its open or inoperative position.

The invention is illustrated in the accompanying drawing, wherein:

Figures 1 to 7 illustrate one embodiment;

Fig. 1 being a perspective view of the keeper,

Fig. 2 a perspective view of the coupling link,

Fig. 3 a perspective view of the chain connector with the keeper in open position, Fig. 4 a front elevation of the chain connector, Figs. 5 and 6 side elevations of the chain connector, with the keeper in open and closed position respectively, Fig. 7 a cross sectional view of the chain connector, with the keeper in closed position, Figures 8 to 11 illustrate an alternative form;

Fig. 8 being a perspective view of the chain connector with the keeper in open position, Fig. 9 a similar view with the keeper in closed position, and Figs. 10 and 11 detail perspective views of the coupling link and the keeper respectively.

Referring to Figures 1 to 7:

The coupling link 1 is of general U-shape and its side bars 2 are formed with aligning hook terminals 3 between whose ends and said side bars there are link passages 4. The keeper 5 includes a body portion 6 which is fitted between the hooks 3 and is provided with end trunnions 7 which are journalled in said hooks. The keeper is formed along one side with an open recess 8 which extends to the ends of the trunnions and by means of which the terminal link 9 of a cross chain may be threaded upon the coupling link 1 and a link 10 of a side chain may be threaded into the hooks 3, all as disclosed and described in my said prior patent.

The keeper and the coupling link form companion elements and, according to the invention, one of the companion elements is provided with a part or parts for co-operation with the other element for the purpose of automatically and effectively holding the keeper in its operative closed position as shown in Figs. 6 and 7, preferably without presenting an obstruction to the ordered movement of the said keeper to open position.

In the form of the invention shown in Figs. 1 to 7 one, or preferably both, of the terminal hooks 3 is provided with an inward projection 11 located about midway of the extent of the hook for engagement with either wall of the recess 8 as a co-operating shoulder. In the construction shown and preferred the body portion 6 of the keeper is of enlarged diameter relatively to the trunnions 7 and the projections 11 are formed as lateral kinks of slight extent for engagement with the adjacent walls of the recess 8 in the body portion 6. The side bars 2 of the coupling link are suitably resilient whereby when the keeper is fitted into position the terminal hooks 3 tend to spring inward toward one another. It follows that when the keeper is turned to closed position as shown in Fig. 7 the projections 11 will engage laterally in the recess 8 and will co-operate with the opposing walls of said recess as shoulders securely to hold the keeper in such closed position while at the same time readily permitting the movement of the keeper to open position when sufficient turning pressure is applied.

The form shown in Figs. 8 to 11 differs only colorably from the form shown in Figs. 1 to 7. In the alternative construction the hooks 3 are not provided with the projections 11 but instead the keeper is provided on one or both of the flat faces of its body portion with projections 11ª for a similar purpose and which are preferably rounded. These projections are located substantially diametrically opposite the mouth or opening of the recess 8 whereby when the keeper is turned to closed position they will project laterally into the passages 4 and will co-operate with the ends of the hooks 3 or the adjacent portions of the side bars 2 as shoulders to secure the keeper in its closed position.

The provision of means for securing the keeper in its closed position is not required when the complete skid chain is in use since the confined bar of the link 10 of the side chain is effective for this purpose owing to the bearing of the side chains against the sides of the tire and to the tension of the cross chains. However, when the skid chains are removed and are folded or rolled indiscriminately for packing or otherwise indiscriminately placed the confined link of the side chain is not definitely or positively caused to exercise the function of securing the keeper in locking position and therefore the projections 11 or 11ª as the case may be are of advantage for this purpose and insure that the cross and side chain elements shall remain in operative assembly and ready for application to a tire whenever their use may be required.

Of course the projections 11 or 11ª instead of being rounded might be made of square form in order positively to latch the keeper in closed position but such formation is not as desirable as that described since it would require the side bars 2 of the coupling link to be sprung outward manually in order to permit the keeper to be turned to open position.

Having fully described my invention, I claim:

1. A chain connector comprising as companion elements a coupling link having resilient side bars provided with terminal hooks and a keeper journalled in said hooks and having a recess which, in the open position of said keeper, aligns with the link passage of said hooks, one of the companion elements having a part for co-operation automatically with the other element when the keeper is turned to closed position for securing the keeper in such position.

2. A chain connector comprising as companion elements a coupling link having resilient side bars provided with terminal hooks and a keeper journalled in said hooks and having a recess providing a link passage and which, in the open position of said keeper, aligns with the link passage of said hooks, one of the companion elements having a projection for engagement automatically in the link passage of the other element when the keeper is turned to closed position for securing the keeper in such position.

3. A chain connector comprising as companion elements a coupling link having resilient side bars provided with terminal hooks and a keeper journalled in said hooks and having a recess providing a link passage and which, in the open position of said keeper, aligns with the link passage of said hooks, one of the companion elements having a projection for engagement automatically in the link passage of the other element when the keeper is turned to closed position for securing the keeper in such position, said projection being so formed as to present no obstruction to the ordered movement of said keeper to open position.

4. A chain connector comprising a coupling link having resilient side bars provided with terminal hooks and a keeper journalled in said hooks and having a recess which in the open position of said keeper aligns with the link passage of said hooks, said keeper having a projection substantially diametrically opposite said recess and which, when the keeper is moved to closed position, automatically engages in said link passage, thereby to secure the keeper in closed position.

In testimony whereof I affix my signature.

ALBERT P. GRIFFIN.